Dec. 9, 1958   F. C. SCHWANEKE   2,863,693
COOKING UTENSIL
Filed Aug. 4, 1953
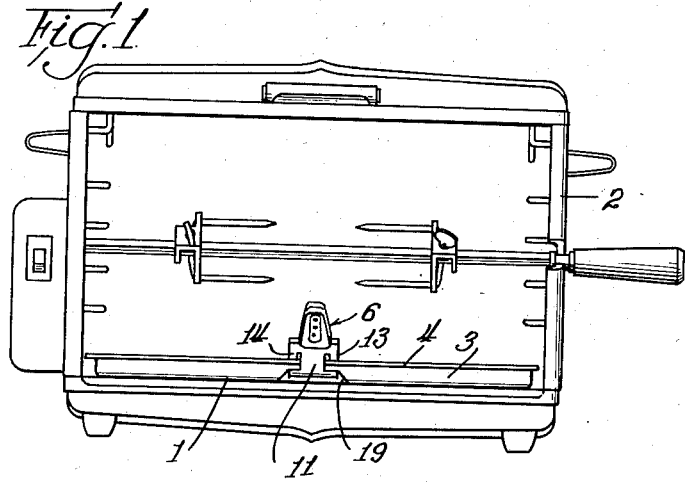
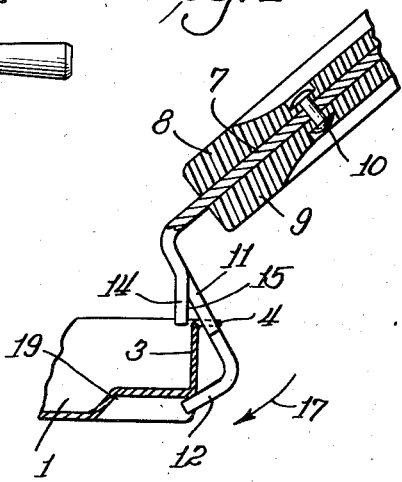
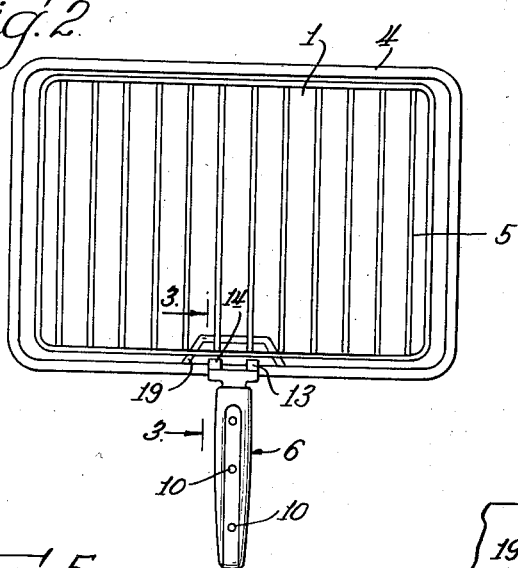
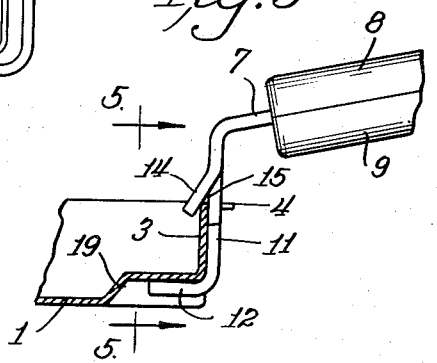
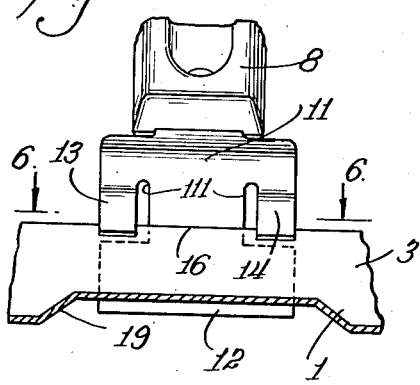
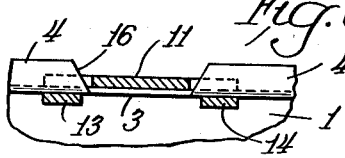
INVENTOR.
Fred C. Schwaneke
BY
Atty.

2,863,693

COOKING UTENSIL

Fred C. Schwaneke, Chicago, Ill., assignor to Dormeyer Corporation, Chicago, Ill., a corporation of Illinois Application August 4, 1953, Serial No. 372,359

2 Claims. (Cl. 294—29)

This invention concerns cooking utensils handles and particularly detachable handles of the clamp-on type for pan-like cooking utensils on which fixed handles are not desirable. For example broiling pans, cake pans, and other like utensils which in use are placed in an oven, do not have fixed handles because, in use, the handle may become too hot to touch and thus be a nuisance rather than a facility. The present invention therefore, relates to detachable handle devices for cooking utensils which can be readily removed while the utensil is desired.

The main objects of this invention are to provide an improved detachable handle for cooking utensils; to provide such device for pan-like utensils for oven use; to provide such a device that can quickly be attached and detached with one hand; to provide such a device that will firmly and securely grip a pan-like cooking utensil as though permanently attached; to provide such a device having an improved shape and simplified construction; to provide a detachable handle for cooking utensils that has no moving parts; to provide such a device that can be easily made by ordinary stamping procedures; to provide such a device that can be made at a low manufacturing cost from materials that are cheap and readily available; and to provide an improved combination of broiling pan and detachable handle therefor.

A specific embodiment of this invention is shown in the accompanying drawings in which:

Fig. 1 is a front view of a conventional electrical Rotissarie having a broiling or drip pan on which the improved handle has been applied.

Fig. 2 is a plan view showing a broiling pan having the improved handle.

Fig. 3 is an enlarged fragmentary sectional view, as taken on line 3—3 of Fig. 2, showing the manner of attachment of the improved handle on the edge of the pan.

Fig. 4 is a similar view but with the handle as positioned preliminary to full engagement of the device to the edge of the pan.

Fig. 5 is a view as taken on line 5—5 of Fig. 3, from the inside of the pan showing the improved handle in secured position, and Fig. 6 is a sectional detail view, as taken on line 6—6 of Fig. 5, showing the laterally spaced arrangement of the gripping elements of the improved device.

As shown in the drawings, the improved cooking utensil handle is applied to a broiling pan 1, such as that supplied with a conventional electric Rotissarie 2, used as a household appliance, the pan 1 being of the usual rectangular form having straight flat sidewalls 3 terminating in an outwardly projecting flange 4 and having the usual removable grill 5. The handle 6, is made from a metal stamping and aside from its pan gripping elements, is of the usual form having a flat elongated hand grip portion 7 encased in upper and lower members 8 and 9, made of wood, or other suitable material, secured by rivets 10.

In the form shown the pan gripping portion 11 of the handle, which projects beyond the hand grip portion 7, is approximately twice as wide as the hand grip portion 7, and is bent at an angle thereto to form a downwardly extending tongue, as shown in Figs. 3 and 4, adapted to lie parallel with the pan sidewall 3 when the handle portion is held in a convenient, somewhat horizontal position in the user's hand. The extremity of the pan gripping portion or tongue 11 is bent forwardly at right angles to provide a foot 12 which projects beneath and engages the bottom of the pan 1, to support the same vertically, when the handle is mounted thereon.

Intermediate its ends the pan gripping tongue portion 11 is provided with two L-shaped slots 111, which are formed in opposite side margins of the tongue and extend inwardly from the edges thereof and then upwardly, to define a pair of laterally disposed downwardly projecting marginal fingers 13 and 14.

These fingers are then bent at an acute angle to the tongue portion 11 so as to extend parallel with each other in an outward direction toward the foot 12 and overhang the side wall 3 of the pan 1 when the handle is mounted thereon, as shown in Figs. 3 and 5.

The location of the fingers 13 and 14, and the acute angle at which they are bent forwardly from the tongue portion 11, are preferably such that the upper margin of the sidewall 3 of the pan 1 will engage and wedge tightly in the vertex of the angle 15, included by the fingers and the tongue, when the foot 12 is engaged against the bottom of the pan. Preferably the fingers 13 and 14 lie in a common plane which intersects the tongue 11 on a line parallel with the plane of the foot 12 and spaced above the foot a distance substantially equal to but slightly greater than the width of the pan sidewall in the vertical direction. Thus, since the fingers are spaced laterally from each other, the pan is supported vertically by the foot 12 and its sidewall is securely held against both forward and lateral tipping, between the fingers and the forward face of the tongue.

Preferably, when the pan and the handle are designed for each other, the bottom of the pan is offset upwardly over a limited area as at 19 and the flange 4 of the pan 1 is cut away as at 16, (see Fig. 6) at substantially the center of its sidewall, so that the vertical tongue portion 11 of the handle will lie flatly against the outer surface of the sidewall. In this way the fingers 13 and 14 may be located so that the narrow vertical edge of the side wall will be wedged tightly in the angle 15 behind the fingers, when the foot 12 is cammed around the bottom corners of the pan as the handle is applied, and the pan and handle will be as firmly and securely connected as though the handle were permanently attached even to using the handle to pour things out of the pan. Thus, the vertical tongue portion 11 of the handle bears inwardly and the spaced fingers 13 and 14 bear outwardly to grip the side of the pan; and the foot 12 is received in the offset 19 to prevent scratching of table tops and provides vertical support and pressure to hold the pan with the edge of its sidewall firmly wedged in the angle 15.

In the use of the improved handle only one hand is ordinarily required to attach the handle to the pan, the procedure being first to hook the fingers over the edge of the pan sidewall, as shown in Fig. 4, and then to depress the hand grip portion of the handle to cam the foot 12 under the bottom corner of the pan and sidewall in the direction of the arrow 17, using the upper edge of the sidewall as a fulcrum. The handle is removed from the pan by the reverse of the attaching operation, that is the hand grip portion is raised, while bearing down on the edge of the pan, to unhook the foot 12 from the bottom of the pan, and then the handle is lifted from the pan to disengage the fingers from the pan sidewall. In attaching the handle the foot 12 by reason of its inherent resiliency may be deflected downwardly slightly by the corner of the utensil (Fig. 4), but will return to its right angle relation with the tongue 11 when completely under the utensil.

The main advantages of this invention reside in the simple arrangement of the foot and fingers by which the side of the pan is firmly and positively interlocked with the attaching portion of the handle so that the handle becomes as a unitary part of the pan; and in the relation of the fingers with respect to the foot and tongue so that direct lateral support of the pan is had to prevent side sway and lateral tipping regardless of the side and lateral extent of the pan with respect to the handle.

Other advantages of this invention reside in its extremely simple construction and the resultant ease of its manufacture; and in the fact that the device may be made of relatively cheap materials and at a very low manufacturing cost.

Although but one specific embodiment of this invention has been herein shown and described it will be understood that details of the particular construction shown may be altered or omitted without departing from the spirit of the invention as defined by the following claims.

What is claimed is:

1. A detachable handle for a flat bottomed utensil having upwardly extending sidewalls, comprising a metal stamping having an elongate hand grip portion, an angularly projecting tongue at one end of and wider than said hand grip portion, a flat forwardly projecting foot at the remote end of said tongue and having substantially the same width as said tongue, the included angle between the tongue and foot being substantially 90°, a pair of laterally spaced short fingers at a predetermined distance above said foot integral with said tongue, said fingers projecting forwardly and downward from the side margins of said tongue toward said foot at an acute angle to said tongue in a plane intersecting said foot, said fingers cooperating with said foot and tongue to permit insertion of the upper edge of a utensil sidewall in the fork defined by said tongue and fingers and to permit free pivotal movement of said foot through an arc defined by said fork to carry said foot from a position substantially outside the utensil to a position snugly engaging the utensil in underlying relation thereto.

2. A detachable handle as in claim 1 in which the fingers are substantially parallel and laterally spaced from each other approximately the width of said grip portion.

References Cited in the file of this patent

UNITED STATES PATENTS

| | | |
|---|---|---|
| 496,422 | Ligon | May 2, 1893 |
| 549,401 | Smith | Nov. 5, 1895 |
| 653,401 | Rausch | July 10, 1900 |
| 1,004,312 | Trotty | Sept. 26, 1911 |
| 1,134,905 | Prochaska | Apr. 6, 1915 |
| 1,254,551 | Tucker | Jan. 22, 1918 |
| 2,364,690 | Bruner | Dec. 12, 1944 |

FOREIGN PATENTS

| | | |
|---|---|---|
| 909,785 | France | Jan. 7, 1946 |